(12) United States Patent
Yamauchi (10) Patent No.: US 10,209,927 B2
(45) Date of Patent: Feb. 19, 2019

(54) INFORMATION PROCESSING APPARATUS, CONTROL METHOD FOR THE SAME, AND MEDIUM

(71) Applicant: CANON KABUSHIKI KAISHA, Tokyo (JP)

(72) Inventor: Mitsugu Yamauchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 15/224,777

(22) Filed: Aug. 1, 2016

(65) Prior Publication Data

US 2017/0060435 A1   Mar. 2, 2017

(30) Foreign Application Priority Data

Aug. 25, 2015   (JP) .................................. 2015-165795

(51) Int. Cl.
 *G06F 3/06*  (2006.01)
(52) U.S. Cl.
 CPC .......... *G06F 3/0679* (2013.01); *G06F 3/0604* (2013.01); *G06F 3/0652* (2013.01)
(58) Field of Classification Search
 None
 See application file for complete search history.

(56) References Cited

U.S. PATENT DOCUMENTS

| | | | | |
|---|---|---|---|---|
| 2004/0095507 | A1* | 5/2004 | Bishop | H04N 1/00283 348/441 |
| 2009/0119468 | A1* | 5/2009 | Taylor | G06F 21/554 711/166 |
| 2012/0254602 | A1* | 10/2012 | Bhansali | G06F 21/575 713/2 |
| 2013/0174264 | A1* | 7/2013 | Chan | G06F 21/00 726/26 |
| 2014/0310532 | A1* | 10/2014 | Ali | G06F 21/81 713/189 |
| 2015/0143535 | A1* | 5/2015 | Mansi | G06F 21/64 726/27 |
| 2015/0261282 | A1 | 9/2015 | Yamauchi | |

FOREIGN PATENT DOCUMENTS

JP       2015-079525 A      4/2015

* cited by examiner

*Primary Examiner* — Tracy C. Chan
(74) *Attorney, Agent, or Firm* — Venable LLC (57) ABSTRACT

In a case where a removable recording medium on which complete erasure has not been performed is accidentally removed from an information processing apparatus, information may be at risk of leaking out from the removed recording medium. In a case where physical removal of the recording medium from the information processing apparatus is detected, the information processing apparatus determines whether the removed recording medium is a recording medium on which complete erasure processing of data recorded thereon has been performed. Then, in a case where it is determined that the complete erasure processing of the data has not been performed, a user is notified of a prompt for the complete erasure processing.

11 Claims, 7 Drawing Sheets

DATA IN SD CARD
HAS NOT BEEN ERASED.
PRESS OK BUTTON TO
PERFORM SD CARD
COMPLETE ERASURE.

FIG.7

INFORMATION PROCESSING APPARATUS, CONTROL METHOD FOR THE SAME, AND MEDIUM

BACKGROUND OF THE INVENTION

Field of the Invention

The present invention relates to a technique for data erasure of recording media inserted into and removed from information processing apparatuses.

Description of the Related Art

Information processing apparatuses such as a PC, a digital camera, and a printer are often configured such that recording media for storing various kinds of data are removably inserted into an information processing apparatus body. Examples of the recording media removably inserted into the information processing apparatus body include an SD card, a USB memory, and the like (hereinafter collectively referred to as a medium/media).

For example, in printers, an SD card is often used as a medium removably inserted into a printer body. The SD card is used for storing documents that require user authentication in printing (hereinafter referred to as secure print documents) and for storing repetitive documents including various forms. Accordingly, the SD card stores data including confidential information and user's private information.

The data stored in a medium is generally erased from a file system once a user performs data deletion or a formatting operation of the medium. However, even if the data is erased from the file system, an entity of the stored data often remains on the medium. In a case where the medium is disposed of while the entity of the above-mentioned data including confidential information and private information remains on the medium, the confidential information and private information may be at risk of leaking out to an external third party.

To avoid information leaks from the disposed medium, it is needed to "completely erase" the data on the medium before disposing of the medium. As used herein, the term "completely erase" means to erase an entity of the data remaining on the medium by the processing such as overwriting of the data. In general, the complete erasure is performed on the medium by a user operation. In a case where the user disposes of the medium after consciously performing a complete erasure operation on the medium, there is no problem. Meanwhile, there may be a case where the user inadvertently forgets to perform the complete erasure operation in disposing of the medium and removes, from the information processing apparatus body, the medium on which complete erasure has not been performed. As a result, the medium is disposed of before the entity of the data on the medium is erased, incurring the risk of leaking out of the above-mentioned confidential information and private information to the external third party.

As a technique of preventing such information leaks, Japanese Patent Laid-Open No. 2015-079525 discloses a technique in which, once a media removal operation by a user is detected, complete erasure is performed on a medium by overwriting data. In the technique disclosed in Japanese Patent Laid-Open No. 2015-079525, once the user trying to remove a medium presses a media insertion/removal switch, complete erasure of the data on the medium is performed and an SD card is kept in a card slot until the complete erasure processing is finished. Then, the SD card is removed from the card slot after the complete erasure processing is finished. Accordingly, even if the user inadvertently forgets to perform the complete erasure operation, the user can completely erase the data on the medium in removal of the medium from the information processing apparatus.

SUMMARY OF THE INVENTION

In the technique disclosed in Japanese Patent Laid-Open No. 2015-079525, however, a mechanism is needed to keep the medium inserted into the information processing apparatus body until the complete erasure processing of the data in the medium is finished, to release the medium from its insertion after the complete erasure processing is finished, and then to allow the medium to be removed. Providing such a mechanism on the information processing apparatus leads to an increase in cost.

The present invention is an information processing apparatus into and from which a recording medium can be inserted and removed and having at least one processor, wherein the processor executes instructions stored in a memory so as to achieve the following units: a determination unit configured to determine whether erasure processing of data in the recording medium has been performed in a case where the recording medium being inserted into the information processing apparatus is removed from the information processing apparatus; and a notification unit configured to notify a user in a case where it is determined that the erasure processing of the data in the recording medium has not been performed.

Further features of the present invention will become apparent from the following description of exemplary embodiments (with reference to the attached drawings).

DESCRIPTION OF THE EMBODIMENTS

An embodiment for carrying out the present invention will be described with reference to the attached drawings. It should be noted that the drawings described in the embodiment are only exemplary and are not intended to limit the scope of the present invention.

Figure 1:
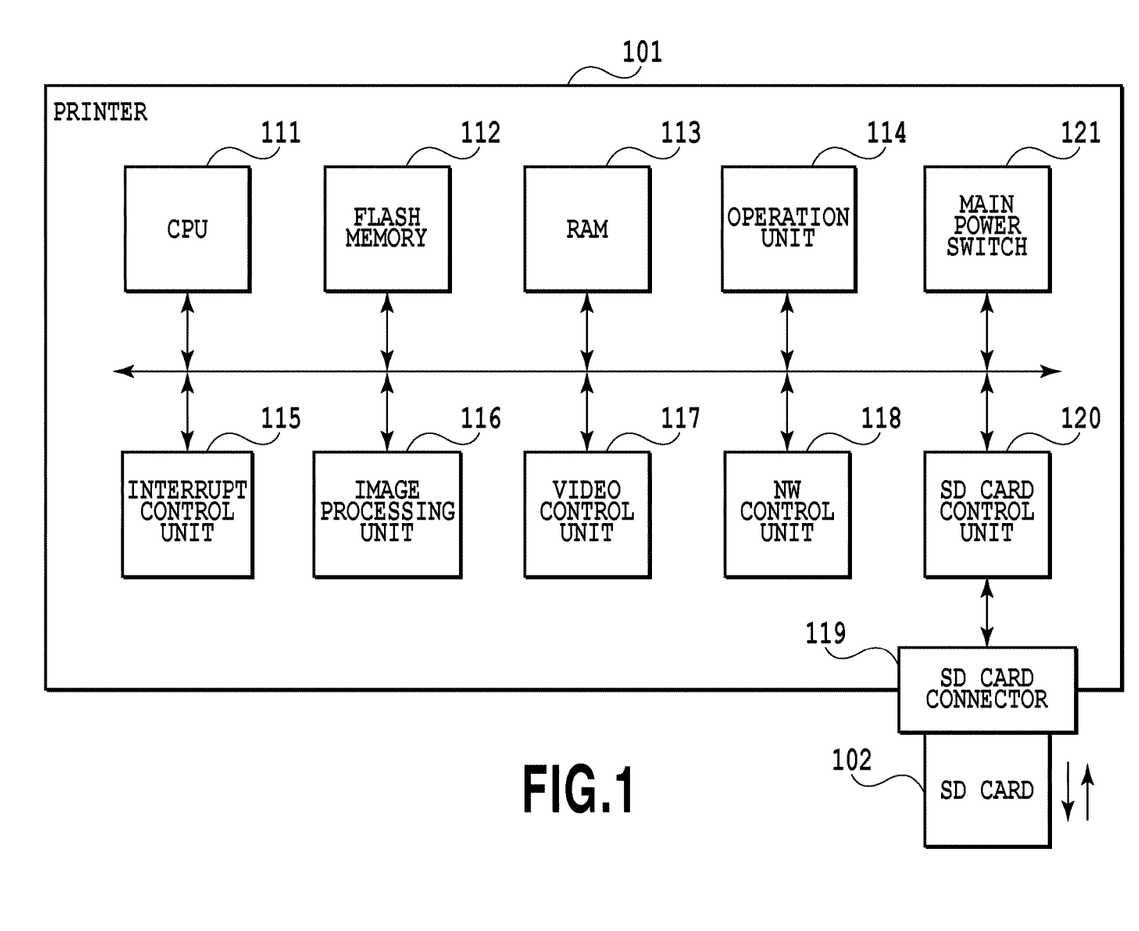
FIG. 1 is a block diagram showing a configuration of a printer according to the present embodiment.

FIG. 1 is a block diagram showing a configuration of a printer as an example of an information processing apparatus according to the present embodiment. In the present embodiment, a description will be given of a printer by way of example, but the information processing apparatus described in the present embodiment is not limited to the printer, and may be other information processing apparatuses such as a PC and a digital camera. That is, any form of information processing apparatuses may be used as long as media are removably inserted.

A printer 101 shown in FIG. 1 includes a CPU 111, a FLASH memory 112, a RAM 113, and an operation unit 114. The printer 101 also includes an interrupt control unit 115, an image processing unit 116, a video control unit 117, a network (NW) control unit 118, an SD card connector 119, an SD card control unit 120, and a main power switch 121. An SD card 102 is inserted into and removed from the SD card connector as an insertable/removable medium. In the present embodiment, a description will be given of a case where a medium removably inserted into the printer 101 is an SD card, but the types of media are not limited to the SD card. Any types of insertable/removable media may be used.

The CPU 111 controls the units of the printer 101 based on various kinds of control programs stored in the FLASH memory 112 and the RAM 113. The FLASH memory 112 stores the various kinds of control programs, font data, and the like. The FLASH memory 112 is further used for storing various kinds of setting information, status information, and the like about the printer 101. The FLASH memory 112 also stores a complete erasure execution flag (described later) of the SD card. The RAM 113 is used for a work memory area of the CPU 111, an area into which image data to be printed is loaded, and the like, as well as a storage area of various kinds of control programs.

The operation unit 114 includes an LCD, an LED, a switch, a beeper, and the like (all not shown) and controls user input to the printer 101 and information output to the user. The image processing unit 116 performs rasterization on a print image based on a print job received by the printer 101. The video control unit 117 outputs rasterized data on the print image to a printer engine (not shown). The NW control unit 118 controls data transmission to and data reception from another information processing apparatus (not shown) connected to the printer 101 over a network.

The SD card connector 119 is a connector into which an SD card is inserted. The user inserts the SD card 102 into the SD card connector 119. An opening of the SD card connector 119, that is, an insertion slot of the SD card 102, is located on a housing portion of the printer 101. The SD card control unit 120 controls read/write of data from/to the SD card 102 inserted into the SD card connector 119. The printer 101 of the present embodiment uses the SD card 102 for storing secure print documents and repetitive documents. The main power switch 121 is a switch for a main power of the printer 101. The user presses the main power switch 121 to control power ON/OFF of the printer 101. The printer 101 has other parts as well, but illustration and description thereof will be omitted for the sake of simplicity.

The printer 101 according to the present embodiment has a high-speed activation mode in main power ON. The high-speed activation (hereinafter referred to as quick activation) in main power ON is a mode to shorten an activation time between the pressing of the main power switch 121 of the printer 101 and the entry into a standby state in which the printer 101 becomes available. In the present embodiment, the user can set whether to enable or disable quick activation of the printer 101 by operating the operation unit 114 as needed.

In a case where the quick activation mode is enabled, pressing of the main power switch 121 of the printer 101 in a standby state or a sleep state by the user changes the printer 101 to a quick OFF state. In the quick OFF state, the CPU 111 is in a sleep state. Details will be described later. Incidentally, in the following description, to distinguish the sleep state of the CPU 111 from the sleep state of the printer 101, sleep of the body of the printer 101 is referred to as "deep sleep," whereas sleep of the CPU 111 is referred to simply as "sleep" in the present embodiment. It should be noted that in a case where the body of the printer 101 is in the sleep state, the CPU 111 can control job reception and a sleep recovery operation, and thus is not in the sleep state.

In the present embodiment, first by way of example, a description will be given of a case where an SD card is removed in the case of the quick OFF state. First, a simple description will be given of the quick OFF state.

The quick OFF state means a state in which, while holding the programs, data, and the like that have been loaded into the RAM 113, power in the other parts of the printer 101 is reduced as much as possible. Holding the programs, data, and the like that have been loaded into the RAM 113 allows quick activation upon startup. In the quick OFF state, the printer 101 in the present embodiment reduces power by stopping power supply to the units of the printer 101. A method for reducing power is not limited to the stopping of power supply. Other methods may be used. In the present embodiment, power supply to the operation unit 114, the image processing unit 116, the video control unit 117, the NW control unit 118, and the SD card control unit 120 of the printer 101 is stopped. Power supply to the printer engine (not shown) is also stopped. At the same time, stopping of the power supply hides the LCD and LED (not shown) of the operation unit 114. Furthermore, input to various buttons (not shown) of the operation unit 114 is also disabled. Since power supply to the NW control unit 118 is also stopped, job reception via the network is also disabled.

Meanwhile, power is supplied to the CPU 111, the FLASH memory 112, the RAM 113, and the interrupt control unit 115 even if the printer 101 is in the quick OFF state. However, the CPU 111 enters the sleep in which only an interrupt from the interrupt control unit 115 is detectable. More specifically, a clock is supplied only to a portion required for interrupt detection in the CPU 111. Supply of clocks to the other portions is stopped and the CPU 111 enters the sleep to be in a low-power state in which only an interrupt is detectable. It should be noted that the entry into a sleep state is referred to as sleep entry, and recovery from the sleep state is referred to as sleep recovery.

The above-described state is the quick OFF state of the printer 101. In the quick OFF state, the operation unit 114 of the printer 101 is hidden, button input is disabled, and job reception is also disabled. For this reason, it appears to a user that the printer 101 is in a power OFF state in which its functions are stopped.

Next, a description will be given of the quick activation of the printer 101. In a case where the main power switch 121 of the printer 101 in the quick OFF state is pressed by the user, the interrupt control unit 115 detects the pressing of the main power switch 121 and outputs an interrupt signal to the CPU 111. In a case where the CPU 111 of the printer 101 detects the interrupt signal, the CPU 111 undergoes sleep recovery from the low-power state. After the sleep recovery, the CPU 111 resumes supply of clocks to the portions to which supply of clocks has been stopped, and a normal operation becomes available. After starting the normal operation, the CPU 111 performs activation processing in accordance with the programs held on the RAM 113. Then in the quick OFF state, power supply to the operation unit 114, the image processing unit 116, the video control unit 117, the NW control unit 118, and the SD card control unit 120 to which power supply has been stopped is resumed. Furthermore, power supply to the printer engine is also resumed. After the series of activation processing is completed, the printer 101 changes to a standby state, allowing the user to use the printer 101. The above-described process is the quick activation of the printer 101.

Figure 2:
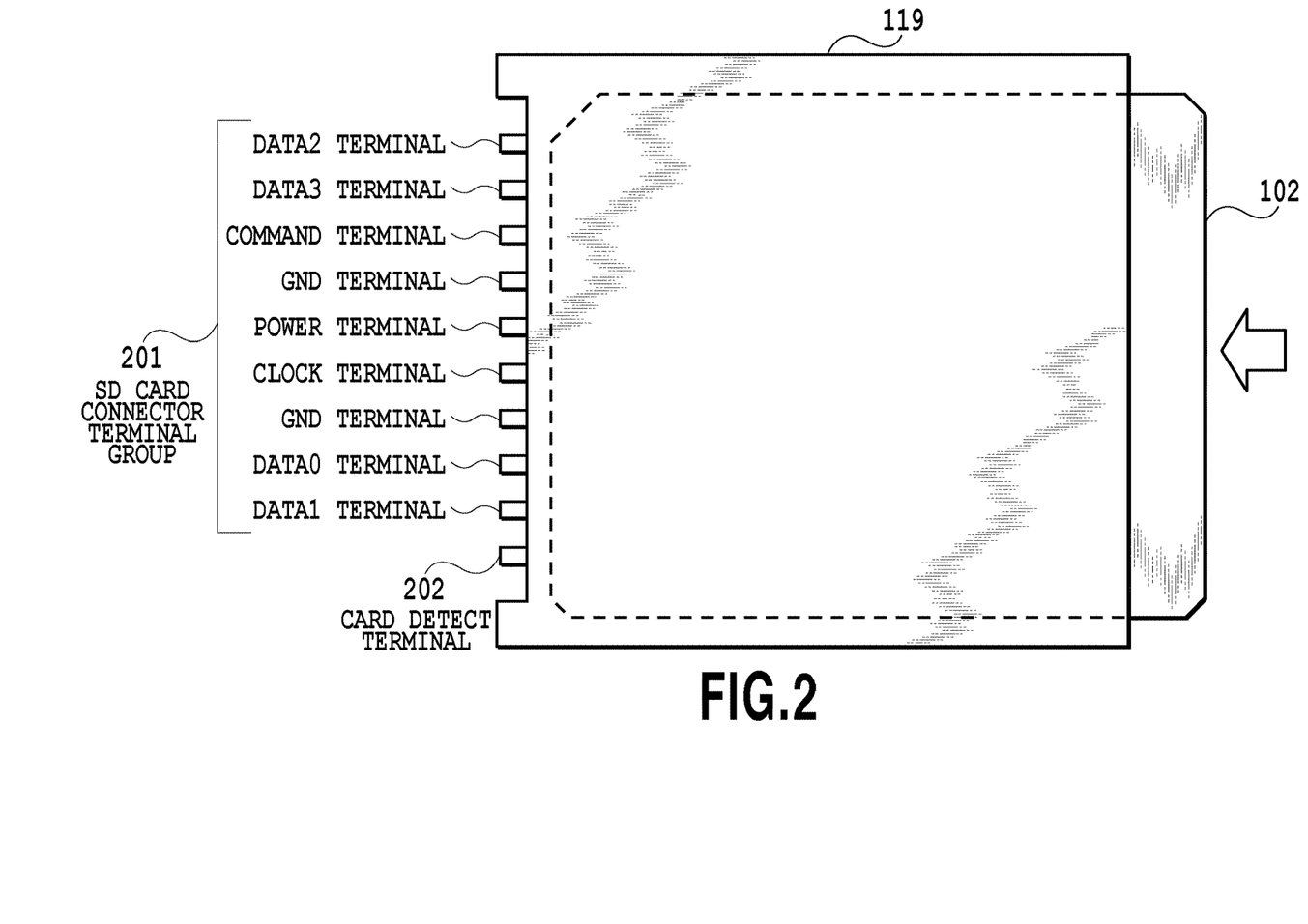
FIG. 2 is a schematic external view showing a state in which an SD card is inserted into an SD card connector.

FIG. 2 is a schematic external view showing a state in which the SD card 102 is inserted into the SD card connector 119. In FIG. 2, a portion shown by a dotted line of the SD card 102 is a portion of the SD card 102 hidden in the SD card connector 119. The SD card connector 119 has an SD card connector terminal group 201 and a Card Detect terminal 202. The SD card connector terminal group 201 specifically includes a Command terminal for a control signal, a Clock terminal, DATA0 to DATA3 terminals for data, a power terminal, and a GND terminal. The Card Detect terminal 202 is used to detect whether the SD card 102 is inserted into the SD card connector 119. Details of the Card Detect terminal 202 will be described later.

FIG. 2 shows a state in which the SD card 102 is being inserted into the SD card connector 119. In this state, the Command terminal, the Clock terminal, the DATA0 to DATA3 terminals, the power terminal, and the GND terminal (all not shown) of the SD card 102 are in contact with the corresponding terminals in the SD card connector terminal group 201 of the SD card connector 119. In a case where the user pushes the SD card 102 to an arrow direction of FIG. 2, the SD card 102 is ejected from the SD card connector 119 from the state in which the SD card 102 is being inserted into the SD card connector 119. More specifically, in a case where the user pushes the SD card 102 in the arrow direction, the SD card connector 119 releases its holding of the SD card 102. After the release of the holding, the user can remove the SD card 102 from the SD card connector 119. In a case where the holding of the SD card 102 is released, the SD card connector terminal group 201 of the SD card connector 119 and the above-mentioned terminals (not shown) of the SD card 102 come in a noncontact state. The functions/operations of the SD card connector 119 described with reference to FIG. 2 are included in widely used and commercially available general-purpose SD card connectors.

Figure 3:
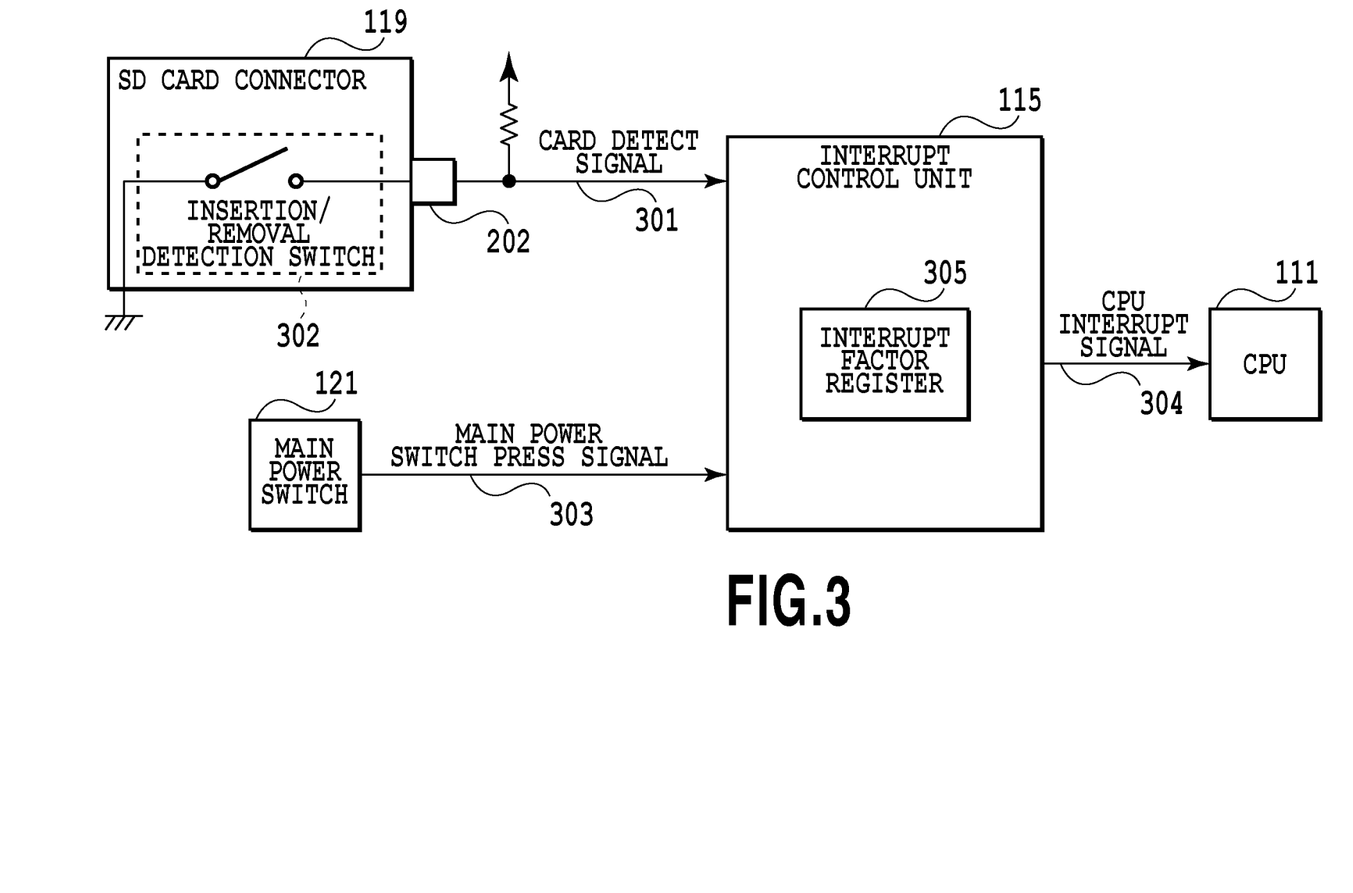
FIG. 3 is a simple block diagram for explaining insertion/removal detection of an SD card.

FIG. 3 is a simple block diagram for explaining an operation of the interrupt control unit 115 of the printer 101. As shown in FIG. 3, a Card Detect signal 301 is outputted from the SD card connector 119 to the interrupt control unit 115. The SD card connector 119 is provided with a switch (hereinafter referred to as an insertion/removal detection switch 302) for detecting insertion/removal of the SD card 102. The insertion/removal detection switch 302 is included in widely used and commercially available general-purpose SD card connectors. As shown in FIG. 3, one terminal of the insertion/removal detection switch 302 is connected to the Card Detect terminal 202, and the other terminal of the insertion/removal detection switch 302 is connected to the GND on a print substrate having the SD card connector 119 mounted thereon. The Card Detect signal 301 is pulled up to a power source on the print substrate. The insertion/removal detection switch 302 is connected (ON) when the SD card 102 is inserted and open (OFF) when the SD card 102 is not inserted. Accordingly, in a case where the SD card 102 is inserted into the SD card connector 119, the Card Detect terminal 202 is connected to the GND and becomes an electrically Low level. In contrast, in a case where the SD card 102 is removed, the Card Detect terminal 202 becomes open and becomes an electrically High level. The interrupt control unit 115 can detect insertion/removal of the SD card based on the level of a Card Detect signal.

Further, a main power switch press signal 303 is outputted from the main power switch 121 to the interrupt control unit 115. In the present embodiment, every time the user presses the main power switch 121, a Low-level pulse signal is outputted as the main power switch press signal 303.

It should be noted that to the interrupt control unit 115, predetermined signals are inputted from the units in the printer 101 as well as the above-described Card Detect signal 301 and main power switch press signal 303. For the sake of simplicity, illustration of the other signals is omitted in FIG. 3.

The interrupt control unit 115 generates a CPU interrupt signal 304 based on the inputted Card Detect signal 301 or the inputted main power switch press signal 303 and outputs it to the CPU 111.

The interrupt control unit 115 has an interrupt factor register 305. The interrupt factor register 305 can determine an interrupt factor detected by the interrupt control unit 115. The CPU 111 which has detected an interrupt by the inputted CPU interrupt signal 304 obtains a value of the interrupt factor register 305 so as to determine the interrupt factor. For example, the CPU 111 which has undergone the sleep entry in the quick OFF state obtains the value of the interrupt factor register 305 so as to determine that the interrupt factor is based on the detection of a change in level of the Card Detect signal 301. That is, the CPU 111 can determine that insertion/removal of the SD card is the interrupt factor.

With reference to FIG. 3, a description will be given of the operation of each unit in a case where the SD card 102 is removed from the printer 101. Removal of the SD card 102 changes the Card Detect signal 301 from the Low level to the High level. The interrupt control unit 115 detects a change in the Card Detect signal 301 from the Low level to the High level. The interrupt control unit 115 which has detected the change outputs the CPU interrupt signal 304. The CPU 111 detects an interrupt by the CPU interrupt signal 304 and obtains a value of the interrupt factor register 305. The CPU 111 determines that an interrupt factor is a change in the Card Detect signal 301 from the Low level to the High level based on the obtained value. In other words, the CPU 111 detects a timing of removal of the SD card 102 through the above-described series of operations. The CPU 111 does not detect that the SD card 102 will be removed but detects that the SD card 102 has actually been removed. In the following description, detection processing at the timing of removal of the SD card 102 is referred to as an "SD card removal interrupt."

Next, with reference to FIG. 3, a description will be given of the operation of each unit in a case where the main power switch 121 of the printer 101 is pressed. In a case where the main power switch 121 is pressed by the user, a Low-level pulse signal is outputted as the main power switch press signal 303. The interrupt control unit 115 detects the Low-level pulse signal of the main power switch press signal 303. The interrupt control unit 115 which has detected the pulse signal outputs the CPU interrupt signal 304 to the CPU 111. The CPU 111 detects an interrupt by the CPU interrupt signal 304, and detects that an interrupt factor is the pressing of the main power switch 121 based on the obtained value of the interrupt factor register 305.

Figure 4:
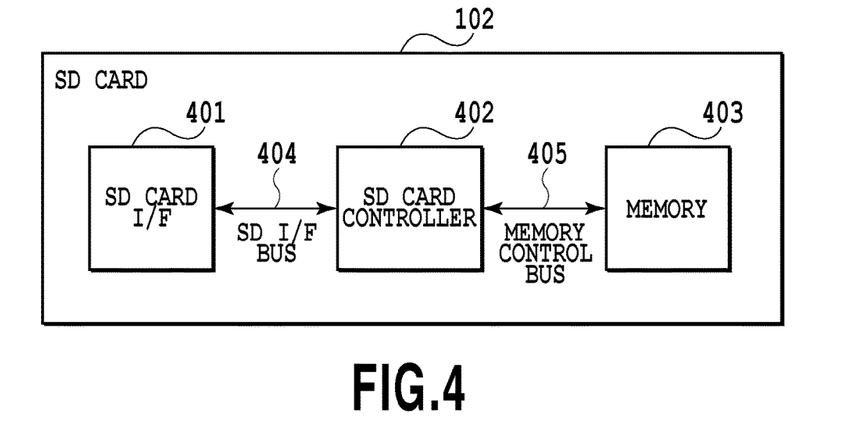
FIG. 4 is a simple block diagram showing a configuration of a widely commercially available SD card.

FIG. 4 is a simple block diagram showing a configuration of the widely commercially available SD card 102. As shown in FIG. 4, the SD card 102 has an SD card interface (hereinafter referred to as an SD card I/F) 401, an SD card controller 402, and a memory 403. Although not shown in FIG. 4, the SD card I/F 401 includes the Command terminal, the Clock terminal, the DATA0 to DATA3 terminals, the power terminal, and the GND terminal as mentioned above. Commands and data are inputted from and outputted to an SD card controller 402 from the SD card I/F 401 via an SD I/F bus 404. The memory 403 is a non-volatile memory such as a FLASH memory, and the SD card controller 402 controls read/write of data from/to the memory 403 and data erasure of the memory 403 via a memory control bus 405. For the SD card 102 of the present embodiment, a data complete erasure command is provided in advance. In a case where the data complete erasure command is inputted from the SD card I/F 401 to the SD card controller 402, the SD card controller 402 performs data complete erasure of the memory 403. In the present embodiment, the SD card controller 402 completely erases existing data on the memory 403 by overwriting the existing data with a random value. However, the method for complete erasure is not limited to this.

Figure 5:
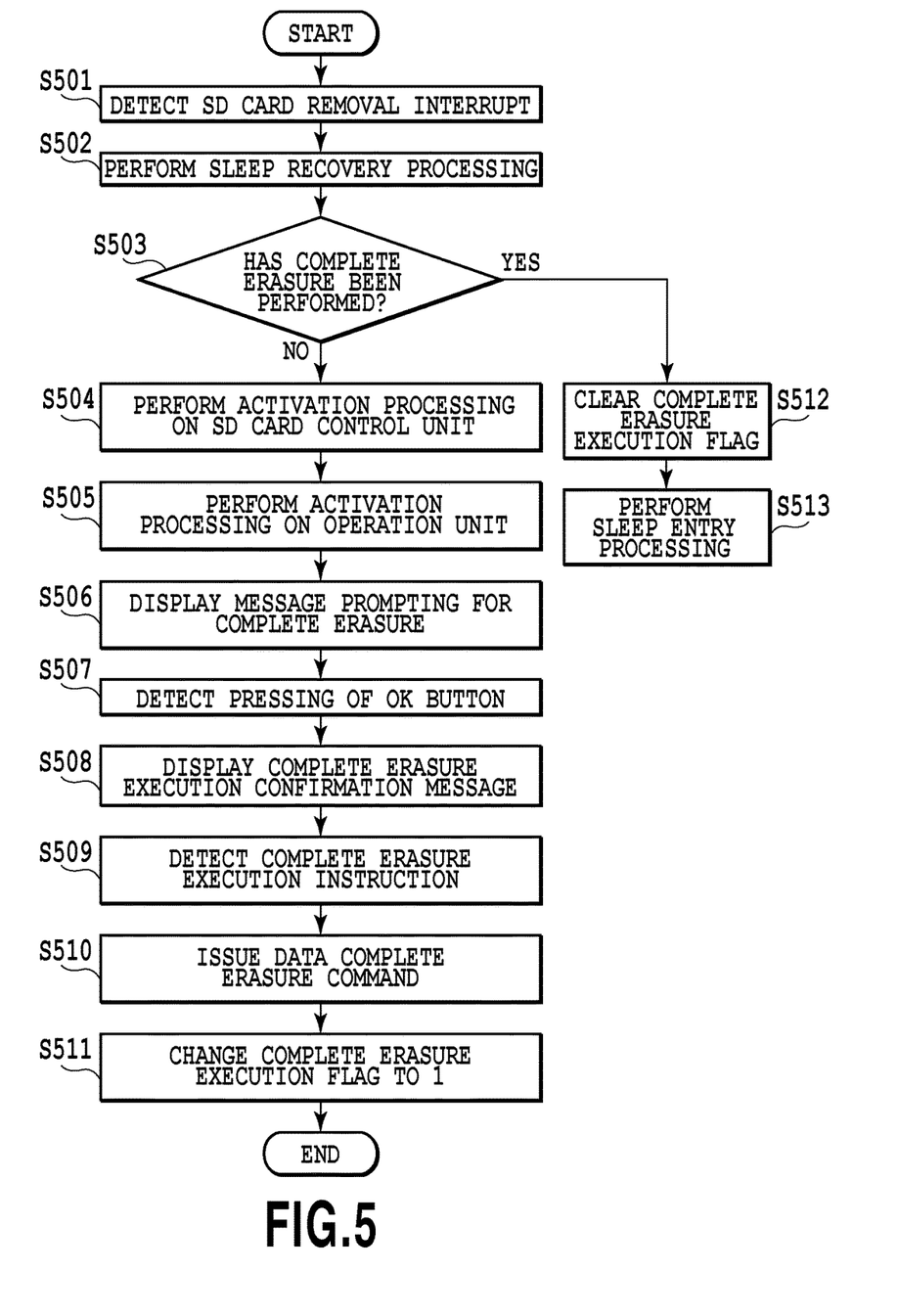
FIG. 5 is a flow chart explaining an operation of a printer according to the present embodiment.
Figure 6:
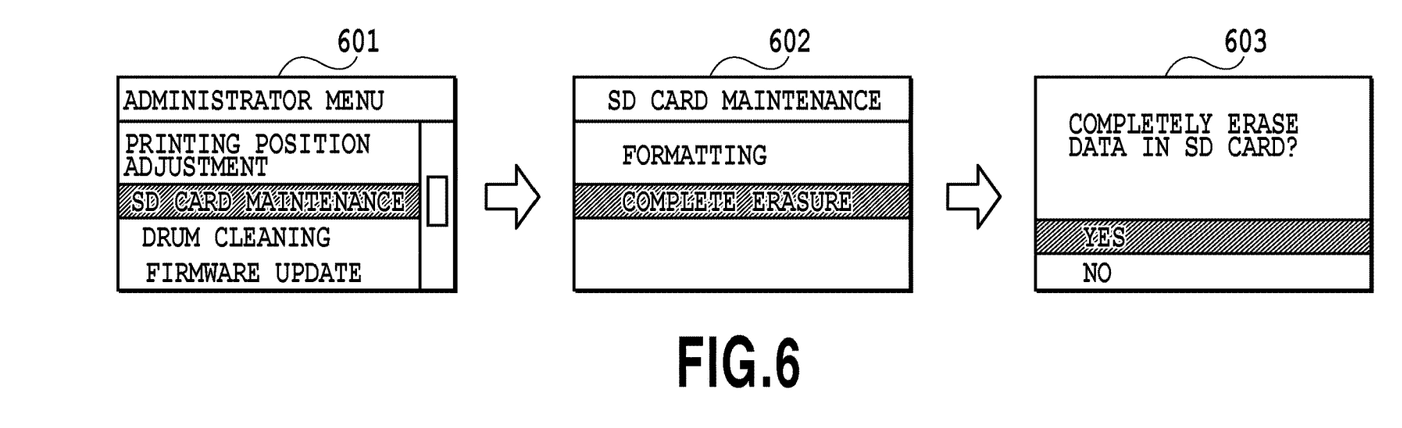
FIG. 6 shows an example of a screen displayed on an operation unit of the printer in an SD card complete erasure operation.
Figure 7:
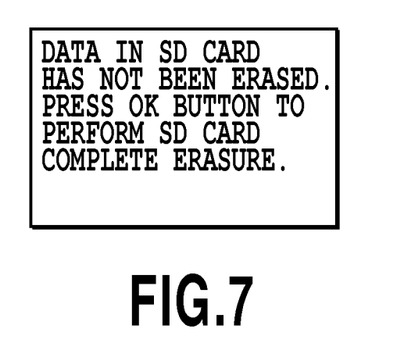
FIG. 7 shows an example of a message display prompting for complete erasure of data in the SD card.

FIG. 5 is a flow chart explaining an operation of the printer 101. FIG. 6 shows an example of a screen displayed on the operation unit 114 of the printer 101 in an SD card complete erasure operation. The screen of FIG. 6 will be described later. FIG. 7 shows an example of a message display prompting for complete erasure of data in the SD card, displayed on the operation unit 114 of the printer 101. The message display of FIG. 7 will be described later.

With reference to FIGS. 1 to 7, a description will be given of complete erasure of the SD card according to the present embodiment. The present embodiment is not directed to a technique based on an idea of holding the SD card until the complete erasure of the SD card is performed, that is, a technique based on an idea of not allowing removal of the SD card until after the complete erasure of the SD card is performed. In the present embodiment, removal of the SD card per se is temporarily allowed even before the complete erasure of the SD card is performed. In a case where the removal (i.e., the actual removal of the card) is detected, the user is notified of the removal of the SD card in which the complete erasure has not been performed. The present embodiment is directed to a technique based on an idea that, in response to an operation by the user who has confirmed the notification, the complete erasure of data is performed anew.

The printer 101 according to the present embodiment has an SD card complete erasure function. The SD card complete erasure can be performed by an administrator of the printer 101 appropriately operating a predetermined button (not shown) on the operation unit 114 of the printer 101. FIG. 6 shows an example of a screen displayed on the operation unit 114 of the printer 101 in the SD card complete erasure operation. In a case where the administrator logs on to the printer 101 and performs a predetermined operation, an administrator menu screen 601 shown in FIG. 6 is displayed. To execute the SD card complete erasure, the administrator selects "SD card maintenance" from the administrator menu screen 601 and presses an OK button (not shown) of the operation unit 114. After the OK button is pressed, an SD card maintenance screen 602 is displayed on the operation unit 114 of the printer 101. The administrator selects "complete erasure" from the SD card maintenance screen 602 and presses the OK button. After the OK button is pressed, a complete erasure execution confirmation message 603 is displayed on the operation unit 114. The complete erasure execution confirmation message is a message for the administrator to confirm whether to execute the complete erasure of the data in the SD card. The administrator who has checked the complete erasure execution confirmation message 603 selects "Yes" in the complete erasure execution confirmation message 603 and presses the OK button. Pressing the OK button instructs the printer 101 to execute the complete erasure of the data in the SD card.

In the present embodiment, a description will be given on an assumption that only the administrator can execute the complete erasure of the SD card. However, an ordinary user who does not possess an administrator right may execute the complete erasure of the SD card.

In a case where the administrator wishes to dispose of the SD card that has been inserted into the printer 101 or in a case where the administrator wishes to completely erase the data in the SD card, the administrator executes an SD card complete erasure operation. Upon detecting an input of the SD card complete erasure operation in the operation unit 114, the CPU 111 of the printer 101 issues a complete erasure command to the SD card 102 via the SD card control unit 120. The SD card receives the complete erasure command in the SD card I/F 401. The SD card controller 402 which has received the complete erasure command from the SD card I/F 401 via the SD I/F bus 404 performs complete erasure of the data on the memory 403. In a case where the complete erasure is completed, the SD card controller 402 sends a notification of the completion of the processing to the CPU 111. Then, the CPU 111 of the printer 101 changes a value of a complete erasure execution flag from 0 to 1 on the FLASH memory 112. The complete erasure execution flag indicates, to the SD card 102 being inserted into the printer 101, whether the complete erasure has been performed.

In a case where the CPU 111 of the printer 101 detects insertion of the SD card 102, an initial value 0 of the complete erasure execution flag is stored on the FLASH memory 112 in association with an ID (a manufacturer ID, a product name, and a serial number) obtained from the inserted SD card 102. As described before, in a case where the complete erasure of the SD card 102 is performed, the CPU 111 changes the value of the complete erasure execution flag from 0 to 1. More specifically, in case where a value of the complete erasure execution flag is 0, the complete erasure has not been performed, whereas in case where a value of the complete erasure execution flag is 1, the complete erasure has been performed. It should be noted that a flag has been described by way of example, but any form of data may be used as long as the data is information indicating whether the complete erasure processing has been performed.

Next, with reference to the flow chart of FIG. 5, a description will be given of an operation of the printer 101 of the present embodiment in a case where the administrator removes the SD card 102 from the printer 101 in the quick OFF state. Note that in the present embodiment, the CPU 111 executes a program stored in a storage unit of either the FLASH memory 112 or the RAM 113, causing the printer 101 to perform the operation shown in the flow chart of FIG. 5.

In a case where the administrator removes the SD card 102 from the printer 101 to try to dispose of or replace the SD card 102, an SD card removal interrupt is generated. The SD card removal interrupt has already been described with reference to FIG. 3. In step S501, the CPU 111 of the printer 101 detects an SD card removal interrupt.

Next, in step S502, the CPU 111 which has detected the SD card removal interrupt performs sleep recovery processing. More specifically, supply of clocks to the portions to which supply of clocks has been stopped in the CPU 111 is resumed, and the CPU 111 begins a normal operation. The reason why the CPU 111 performs the sleep recovery processing is, as will be described later, to refer to the value of the complete erasure execution flag on the FLASH memory 112.

Next, in step S503, the CPU 111 determines whether the complete erasure of data has been performed on the SD card 102. More specifically, the CPU 111 refers to the value of the complete erasure execution flag on the FLASH memory 112. In a case where the value is 1, the CPU 111 determines that the complete erasure has been performed. In a case where the value is 0, the CPU 111 determines that the complete erasure has not been performed.

First, a description will be given of processing in step S503 in a case where the CPU 111 determines that complete erasure of data has not been performed on the SD card 102 (No in S503). For example, in a case where the administrator inadvertently forgets to perform the complete erasure operation, the complete erasure of data has not been performed on the SD card 102. In this case, the value of the complete erasure execution flag remains 0. In such a case, the CPU 111 determines that the complete erasure has not been performed. In a case where the complete erasure has not been performed, the process proceeds to step S504.

In step S504, the CPU 111 performs activation processing on the SD card control unit 120. More specifically, the CPU 111 resumes power supply to the SD card control unit 120 to which power supply has been stopped and makes the SD card control unit 120 operable.

Next, in step S505, the CPU 111 performs activation processing on the operation unit 114. More specifically, the CPU 111 resumes power supply to the operation unit 114 to which power supply has been stopped and makes the operation unit 114 operable.

Then in step S506, the CPU 111 displays, on the operation unit 114, a message prompting for complete erasure of the data in the SD card. FIG. 7 shows an example of a message display displayed in step S506. In addition to the message display shown in FIG. 7, sound of a beeper (not shown) provided for the printer 101 may also be used. FIG. 7 includes a message indicating that the complete erasure processing of the SD card has not been performed. FIG. 7 also includes a message prompting the user for the complete erasure operation of the SD card. As shown in FIG. 7, both of the message indicating that the complete erasure processing of the SD card has not been performed and the message prompting the user for the complete erasure operation of the SD card may be displayed. Alternatively, one of the messages may be displayed.

The administrator (the administrator who has removed the SD card) who has checked the message displayed on the operation unit 114 as shown in FIG. 7 realizes that he or she has not performed the complete erasure of the SD card 102 yet. Then, the administrator inserts the removed SD card 102 again into the SD card connector 119 of the printer 101 and presses the OK button (not shown) on the operation unit 114 in accordance with the message shown in FIG. 7.

In step S507, in a case where the CPU 111 detects that the OK button on the operation unit 114 is pressed, the process proceeds to step S508, and the CPU 111 displays a complete erasure execution confirmation message on the operation unit 114.

The complete erasure execution confirmation message displayed in step S508 is a message to confirm whether to execute the complete erasure of the data in the SD card. This is the same as the complete erasure execution confirmation message 603 that has already been described with reference to FIG. 6. The administrator who has checked the complete erasure execution confirmation message like the complete erasure execution confirmation message 603 appropriately operates a predetermined button (not shown) on the operation unit 114 and instructs the printer 101 to execute the complete erasure of the data in the SD card. This will be described using the complete erasure execution confirmation message 603. The administrator selects "Yes" in the complete erasure execution confirmation message 603 and presses the OK button. Pressing the OK button instructs the printer 101 to execute the complete erasure of the data in the SD card.

In step S509, the CPU 111 of the printer 101 detects a complete erasure execution instruction after displaying the complete erasure execution confirmation message in S508. More specifically, the CPU 111 detects the above-mentioned data complete erasure instruction in the operation unit 114.

In step S510, the CPU 111 issues a data complete erasure command to the SD card 102. More specifically, the SD card control unit 120 transmits the data complete erasure command to the SD card 102 based on the control by the CPU 111. The SD card 102 which has received the complete erasure command from the SD card control unit 120 performs data complete erasure of the memory 403 by the SD card controller 402 provided therein.

Then in step S511, the CPU 111 changes the value of the complete erasure execution flag on the FLASH memory 112 from 0 to 1.

In the present embodiment, in a case where the SD card 102 on which complete erasure of data has not been performed is removed from the printer 101, it is possible to display a message prompting for complete erasure of the data in the SD card on the operation unit 114 of the printer 101. The message display allows the administrator who has removed the SD card from the printer 101 to realize that he or she has forgotten to perform the complete erasure operation of the SD card. Then, the administrator inserts the SD card again into the printer and executes complete erasure of the data in the SD card. This can prevent data leaks from the SD card.

It should be noted that in the present embodiment, the administrator is prompted to execute complete erasure of the data in the SD card by a message displayed on the operation unit 114 of the printer 101, but other methods may also be used. For example, in a case where the printer 101 has a voice output unit, a voice message may be used to prompt for the execution of complete erasure of the data. That is, any method may be used to notify a user of removal of an SD card while complete erasure of the SD card has not been performed. In the present embodiment, a mechanism to physically prevent removal of the SD card on which complete erasure is not performed is not provided, but the user who has forgotten to perform the complete erasure operation is temporarily allowed to remove the SD card. After that, processing is performed to promptly notify the user that complete erasure has not been performed. According to such a mode, the user may be prompted for the complete erasure operation of the SD card, without providing a mechanism to prevent removal of the SD card.

Next, a description will be given of the case where the CPU 111 determines that the complete erasure has been performed (Yes in S503) in the determination in step S503 of whether the complete erasure of data has been performed on the SD card 102. This corresponds to the case where the administrator trying to dispose of the SD card 102 has already executed the complete erasure operation before the SD card 102 is removed from the printer 101. In this case, next in step S512, the CPU 111 clears the complete erasure execution flag. More specifically, the CPU 111 clears the ID of the SD card 102 and the value of the complete erasure execution flag corresponding to the ID stored on the FLASH memory 112.

Next in step S513, the CPU 111 enters a sleep state. As a result, the printer 101 becomes a quick OFF state. In a case where the CPU 111 determines that the complete erasure of the data in the SD card 102 has been performed, the above-described processing from steps S504 to S511 is omitted. In this case, since the administrator has already performed the complete erasure of the data in the SD card 102, needless to say, a message display prompting for the complete erasure of the data in the SD card is not needed. In this example, a description has been given of the example of not using the message display, but for example, processing may be performed to display a message indicating that the complete erasure of the removed SD card has been performed. Then, sleep entry processing of S513 may be performed. In this case, after step S512, operation unit activation processing may be performed like in step S505, and processing may be performed to display a message indicating that the complete erasure of the removed SD card has been performed.

In the above-described example, the operation of the printer 101 in a case where the SD card 102 of the printer 101 in the quick OFF state is removed has been described. However, the present embodiment is not limited to the case of the quick OFF state.

Next, a description will be given of the operation in a case where the SD card 102 is removed from the printer 101 not in the quick OFF state, but in a deep sleep state. The operation in this case is basically the same as the operation in the case where the SD card 102 is removed from the printer 101 in the quick OFF state described with reference to FIG. 5. In the deep sleep state, however, power is supplied to the NW control unit 118 of the printer 101, and job reception is enabled. In the deep sleep state, power is partly supplied to the operation unit 114, and a sleep recovery operation by pressing a predetermined button is enabled. In the deep sleep state, the CPU 111 can control the job reception and sleep recovery operation, and is not in a low-power state in which only an interrupt is detectable. Therefore, the operation in a case where the SD card 102 is removed from the printer 101 in the deep sleep state is an operation in which the sleep recovery processing (S502) and the sleep entry processing (S513) of the CPU 111 in the flow chart of FIG. 5 are omitted.

Next, a description will be given of the operation in a case where the SD card 102 is removed from the printer 101 in the standby state. The operation in this case is also basically the same as the operation in the case where the SD card 102 is removed from the printer 101 in the quick OFF state described with reference to FIG. 5. In the standby state, however, power is supplied to the units of the printer 101, and the CPU 111 is not in sleep. Therefore, the operation is an operation in which the sleep recovery processing (S502), the sleep entry processing (S513), the SD card control unit activation processing (S504), and the operation unit activation processing (S505) of the CPU 111 in the flow chart of FIG. 5 are omitted.

As described above, also in the case where the SD card on which data complete erasure has not been performed is removed from the printer 101 in the deep sleep state or the standby state, it is possible to display a message prompting for complete erasure of the data in the SD card on the operation unit 114.

Next, a description will be given of the operation of the printer 101 in a case where after the SD card 102 on which data complete erasure has been performed is once removed from the printer 101, the SD card 102 is inserted into the printer 101 again. In a case where the SD card 102 on which complete erasure has been performed is removed from the printer 101, as already described with reference to FIG. 5, the ID of the SD card 102 and the value of the complete erasure execution flag corresponding to the ID on the FLASH memory 112 have already been cleared (S512). In a case where the SD card 102 is inserted into the printer 101 again and the CPU 111 of the printer 101 detects insertion of the SD card 102, the ID of the SD card 102 and the initial value 0 of the complete erasure execution flag corresponding to the ID are stored again in the FLASH memory 112. The subsequent operation is the same as the series of the operations described with reference to FIG. 5. Therefore, even in a case where the SD card 102 on which data complete erasure has been performed is once removed from the printer, the administrator or the user can insert the SD card 102 again into the printer 101 and use it.

Next, a description will be given of an operation in a case where the SD card 102 on which data complete erasure has been performed is kept inserted into the printer 101 without being removed from the printer 101. As described above, after performing the complete erasure of the data in the SD card 102, the value of the complete erasure execution flag becomes 1. In a case where the administrator or the user wishes to use the SD card 102 again in the printer 101 without removal of the SD card 102, the administrator or the user appropriately operates the operation unit 114, and formats the SD card 102. After the formatting, the printer 101 can store in the SD card 102 data such as secure print documents or repetitive documents. After the formatting, in a case where the data such as secure print documents or repetitive documents is first stored in the SD card 102 by a user operation, the CPU 111 of the printer 101 changes the value 1 of the complete erasure execution flag to 0. Until the complete erasure of the data in the SD card 102 is performed again, the value of the complete erasure execution flag remains 0. Accordingly, even in the case where the SD card 102 on which data complete erasure has been performed is kept inserted into the printer 101 without being removed from the printer 101, the administrator or the user can use the SD card 102 again.

In the above embodiment, the example has been described in which data such as secure print documents or repetitive documents is stored in the SD card. However, the data included in the SD card is not limited to this. Any data including a document, image data, and voice data may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a case where a medium on which complete erasure processing has not been performed is removed from an information processing apparatus body by a user, the user may be prompted for a complete erasure operation. Therefore, the user can recognize that he or she has forgotten to perform the complete erasure operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-165795 filed Aug. 25, 2015, which is hereby incorporated by reference wherein in its entirety.

What is claimed is:

1. An information processing apparatus into and from which a recording medium can be inserted and removed, the information processing apparatus comprising:
    a controller including a memory storing instructions and a processor which executes the instructions, the controller being configured to determine whether erasure processing of data in the recording medium has been performed;
    a recovery controller for recovering the controller from a sleep state in a case where the recording medium is removed; and
    a display,
    wherein in a case where the recovered controller determines that data in the removed recording medium is not erasure processed, the recovered controller recovers the display from a sleep state, and
    the recovered display displays a notification to a user.

2. The information processing apparatus according to claim 1,
    wherein in a case where the recovered controller determines that in the removed recording medium is erasure processed, the recovered controller is caused to enter the sleep state.

3. The information processing apparatus according to claim 1,
    further comprising a storage unit configured to store information indicating that erasure processing of the data recorded on the recording medium has not been performed,
    wherein in a case where the recording medium is inserted into the information processing apparatus, and the erasure processing of the data is performed on the recording medium, the information stored in the storage unit is overwritten with information indicating that erasure processing of the data recorded on the recording medium has been performed, and
    wherein the recovered controller determines whether the erasure processing of the data in the recording medium has been performed based on the information stored in the storage unit.

4. The information processing apparatus according to claim 3, wherein in a case where the recovered controller determines that the information stored in the storage unit is information indicating that the erasure processing of the data has been performed, the information stored in the storage unit is deleted.

5. The information processing apparatus according to claim 1, wherein the recovered display notifies a message indicating that the erasure processing of the data recorded on the recording medium has not been performed or a message prompting for erasure of the data recorded on the recording medium.

6. A control method for an information processing apparatus into and from which a recording medium can be inserted and removed, the information processing unit having a controller recoverable from a sleep state and a display recoverable from a sleep state, the control method comprising at least the steps of:
    determining, using the controller, whether erasure processing of data in the recording medium has been performed; and
    recovering the controller from a sleep state in a case where the recording medium is removed,
    wherein in a case where the recovered controller determines that data in the removed recording medium is not erasure processed, further comprising the steps of:
    recovering the display from a sleep state by using the recovered controller, and
    displaying a notification to a user by using the recovered display.

7. The control method according to claim 6, wherein in a case where the determining step determines that data in the removed recording medium is erasure processed, further comprising the step of causing the recovered controller to enter the sleep state.

8. The control method according to claim 6,
    further comprising the step of storing information indicating that erasure processing of the data recorded on the recording medium has not been performed,
    wherein in a case where the recording medium is inserted into the information processing apparatus, and the erasure processing of the data is performed on the recording medium, the information stored in the step of storing is overwritten with information indicating that erasure processing of the data recorded on the recording medium has been performed, and
    wherein the determining step determines whether the erasure processing of the data in the recording medium has been performed based on the information stored in the storing step.

9. The control method according to claim 8, wherein in a case where the determining step determines that the information stored in the storing step is information indicating that the erasure processing of the data has been performed, the information stored in the storing step is deleted.

10. The control method according to claim 6, wherein in the step of displaying, a message indicating that the erasure processing of the data recorded on the recording medium has not been performed or a message prompting for erasure of the data recorded on the recording medium is notified.

11. A non-transitory computer readable storage medium storing a program for causing a computer to function as an information processing apparatus into and from which a recording medium can be inserted and removed, the information processing unit having a controller recoverable from a sleep state and a display recoverable from a sleep state, the program causing the computer to perform at least the steps of:

determining, using the controller, whether erasure processing of data in the recording medium has been performed; and     recovering the controller from a sleep state in a case where the recording medium is removed,     wherein in a case where the recovered controller determines that data in the removed recording medium is not erasure processed, the program further causing the computer to perform at least the steps of:

recovering the display from a sleep state by using the recovered controller, and     displaying a notification to a user by using the recovered display.

\* \* \* \* \*